(12) United States Patent
Kambe et al.

(10) Patent No.: US 6,890,624 B1
(45) Date of Patent: May 10, 2005

(54) SELF-ASSEMBLED STRUCTURES

(75) Inventors: Nobuyuki Kambe, Menlo Park, CA (US); Peter S. Dardi, St. Paul, MN (US)

(73) Assignee: NanoGram Corporation, San Jose, CA (US)

( * ) Notice: Subject to any disclaimer, the term of this patent is extended or adjusted under 35 U.S.C. 154(b) by 0 days.

(21) Appl. No.: 09/558,266

(22) Filed: Apr. 25, 2000

(51) Int. Cl.[7] .............................. B32B 7/02; B32B 5/16; C25D 5/02; B05D 1/36; B05D 5/00

(52) U.S. Cl. .................... 428/195.1; 428/212; 428/323; 205/118; 205/221; 427/201; 427/203; 427/204; 427/205; 427/215; 427/261; 427/256

(58) Field of Search .............................. 428/195.1, 212, 428/323, 144, 206, 202, 195, 336; 205/118, 221; 427/201, 203, 204, 205, 215, 261, 256, 199; 430/5

(56) References Cited

U.S. PATENT DOCUMENTS

| | | | |
|---|---|---|---|
| 4,728,591 A | 3/1988 | Clark et al. ..................... 430/5 |
| 5,352,485 A | * 10/1994 | DeGuire et al. ............. 427/226 |
| 5,726,524 A | 3/1998 | Debe .......................... 313/309 |
| 5,744,305 A | 4/1998 | Fodor et al. .................... 435/6 |
| 5,751,018 A | 5/1998 | Alivisatos et al. ............. 257/64 |
| 5,795,559 A | 8/1998 | Pinnavaia et al. ........... 423/702 |
| 5,804,563 A | 9/1998 | Still et al. ..................... 514/26 |
| 5,821,311 A | 10/1998 | Mosbach et al. ............ 526/201 |
| 5,840,264 A | 11/1998 | Pinnavaia et al. ........... 423/277 |
| 5,879,827 A | * 3/1999 | Debe et al. .................... 429/40 |
| 5,880,012 A | 3/1999 | Ha et al. ..................... 438/494 |
| 5,880,525 A | 3/1999 | Boudreau et al. ........... 257/752 |
| 5,897,918 A | 4/1999 | Singh et al. ................. 427/352 |
| 5,905,296 A | 5/1999 | Tuttle .......................... 257/536 |
| 5,939,150 A | 8/1999 | Stelzle et al. ................ 427/558 |
| 5,958,348 A | 9/1999 | Bi et al. .................. 422/186.04 |
| 6,034,468 A | 3/2000 | Wilshaw ...................... 313/309 |
| 6,040,611 A | 3/2000 | De Los Santos et al. ... 257/415 |

OTHER PUBLICATIONS

"Molecular Imprinting in Cross–Linked Materials With The Aid Of Molecular Templates–A Way Towards Artificial Antibodies" by, Günter Wulff, Angew, Chem, Int. Ed. Engl. 1995, 34, pp. 1812–1832.

"Nonlithographic Nano–Wire Arrays: Fabrication, Physics, and Device Applications" by, Rourkevitch et al., IEEE Transactions on Electron Devices, vol. 43, No. 10, Oct. 1996, pp. 1646–1658.

* cited by examiner

Primary Examiner—Bruce H. Hess
Assistant Examiner—Lawrence Ferguson
(74) Attorney, Agent, or Firm—Patterson, Thuente, Skaar & Christensen; Peter S. Dardi

(57) ABSTRACT

A material includes a layer with a plurality of self-assembled structures comprising compositions. The structures are localized in separate islands covering a portion of the layer in an integrated assembly. In some embodiments, the compositions include nanoparticles. In particular, some embodiments pertain to a material with a self-assembled formation of inorganic particles with an average diameter less than about 100 nm. The structures can be used as devices within an integrated article. The method for producing the articles comprise a localization process defining boundaries of the devices and a self-assembly process within the identified boundaries.

27 Claims, 6 Drawing Sheets

SELF-ASSEMBLED STRUCTURES

BACKGROUND OF THE INVENTION

The invention relates to small scale structures forming devices with application, for example, to microelectronics. In particular, the invention relates to self-assembled structures on and/or within a surface of a material structure.

Advances in a variety of fields have created a demand for many types of new materials. In particular, a variety of chemical powders can be used in many different processing contexts. Specifically, chemical powders can be used in the production of electronic devices, such as flat panel displays, electronic circuits and photonic crystals.

Similarly, technological advances have increased the demand for improved material processing with strict tolerances on processing parameters. As miniaturization continues even further, material parameters will need to fall within stricter tolerances. Current integrated circuit technology already requires tolerances on processing dimensions on a submicron scale. Self-assembly approaches have been developed to provide additional options for the application of very thin films of materials. However, self-assembly approaches generally have been limited with respect to the types of materials that can be deposited by a particular approach.

SUMMARY OF THE INVENTION

In a first aspect, the invention pertains to a material having a layer, the layer comprising a plurality of self-assembled structures comprising compositions. The structures are localized in separate islands covering a portion of the layer in an integrated assembly.

In an additional aspect, the invention pertains to a material comprising a self-assembled formation of inorganic particles. The inorganic particles have an average primary particle diameter less than about 100 nm. Also, the particles comprise a composition selected from the group consisting of metal/silicon oxides, metal/silicon carbides, metal/silicon nitrides and elemental metal.

In another aspect, the invention pertains to a method for generating devices on a layer within specified boundaries. The method includes localizing the boundaries of the devices, and initiating a self-assembly process to deposit a plurality of structures comprising compositions.

In a further aspect, the invention pertains to an article comprising a plurality of integrated devices wherein at least one device comprises a self-assembled array of compositions.

DETAILED DESCRIPTION OF THE ILLUSTRATIVE EMBODIMENTS

Figure 1:
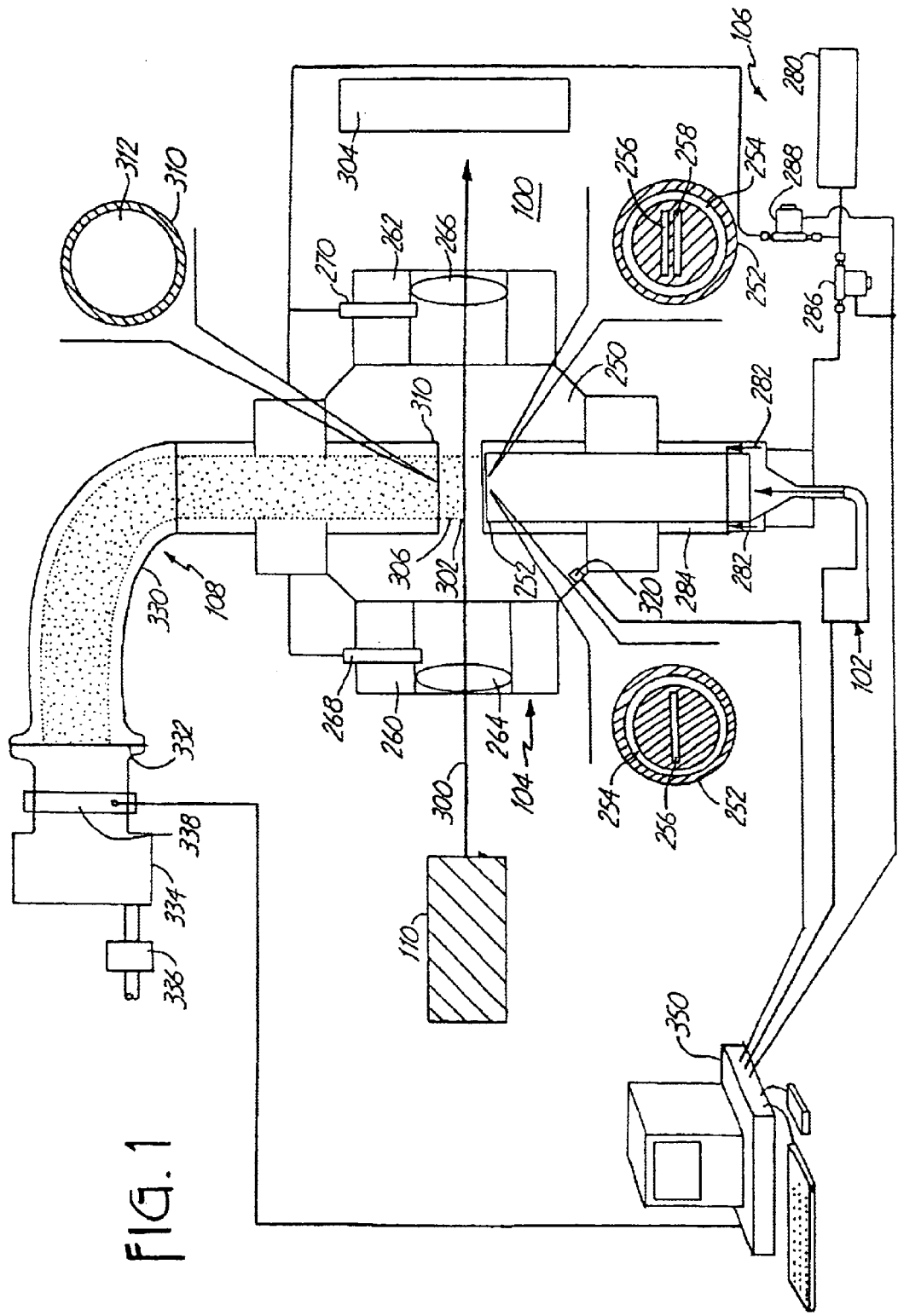
FIG. 1 is a schematic, sectional view of an embodiment of a laser pyrolysis apparatus taken through the middle of the laser radiation path. The lower inserts are bottom views of the injection nozzle with one or two reactant inlets, and the upper insert is a bottom view of the collection nozzle.

Extremely small and well defined structures, for example of inorganic particles, can be formed in association with a surface using self-assembly approaches. Nanoparticles with very uniform sizes are preferred components for forming self-assembled structures, although other functional compositions can be used. The nanoparticles are organized into a well defined structures using fabrication techniques that take advantage of molecular recognition characteristics of self-assembly approaches. Molecular recognition can involve various interactions, such as commingling, key-lock relationships and guest-host interactions.

The deposition techniques are combined with localization techniques that constrain the resulting structures within isolated islands along the substrate surface. The islands can be ordered or disordered arrays. The organized structures or islands are suitable for the production of microelectronics and the like, which incorporate well defined miniature components. Preferred nanoparticles can be produced by laser pyrolysis with or without additional processing.

The structures of interest involve localized miniature components formed on a substrate surface. Thus, the self-assembly approaches provide an alternative to traditional masking techniques and direct formation approaches for fabricating device structures. In contrast with many conventional self-assembly techniques, the structures formed in preferred embodiments incorporate inorganic nanoparticles rather than molecules. Thus, an ordered or disordered array is formed of the nanoparticles within the boundaries of the structure or mingled structure domains.

Laser pyrolysis is an excellent approach for efficiently producing a wide range of nanoscale particles with a narrow distribution of average particle diameters. In particular, laser pyrolysis can be used to produce a variety of inorganic particles, such as elemental metal particles, metal/silicon oxide particles, metal/silicon carbide particles, metal/silicon nitride particles and metal/silicon sulfide particles. Alternatively, nanoparticles can be produced using a flame production apparatus such as the apparatus described in U.S. Pat. No. 5,447,708 to Helble et al., entitled "Apparatus for Producing Nanoscale Ceramic Particles," incorporated herein by reference. Furthermore, nanoparticles can be produced with a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

A basic feature of successful application of laser pyrolysis for the production of desirable inorganic nanoparticles is the generation of a reactant stream containing a metal/silicon precursor compound, a radiation absorber and, generally, a secondary reactant. The secondary reactant can be a source of atoms, such as oxygen, required for the desired product or an oxidizing or reducing agent to drive a desired product formation. A secondary reactant is not needed if the precursor decomposes to the desired product under intense light radiation. The reactant stream is pyrolyzed by an intense light beam, generally a laser beam. As the reactant stream leaves the laser beam, the particles are rapidly quenched.

Nanoparticles produced by laser pyrolysis can be subjected to additional processing to alter the nature of the particles, such as the composition and/or the crystallinity. For example, the nanoparticles can be subjected to heat processing in a gas atmosphere prior to use. Under suitably mild conditions, heat processing is effective to modify the characteristics of the particles without destroying the nanoscale size or the narrow particle size distribution of the initial particles.

For many applications, the powder is dispersed in a liquid or other fluid for use or for further processing. For the purposes of discussion herein, particle dispersions have concentrations of nanoparticles no more than about 80 weight percent. Appropriate properties of the resulting dispersion may depend on the features of the self-assembly approach, as described below.

Preferred collections of inorganic nanoparticles for forming microelectronic or other miniature components have an average diameter less than a 100 nm and a very narrow distribution of primary particle diameters. In particular, the distribution of primary particle diameters preferably does not have a tail. In other words, there are effectively no particles with a diameter four times greater than the average diameter such that the particle size distribution rapidly drops to zero. Not only does the particle size distribution not have a tail, the peak of the distribution is also very narrow, as described further below.

These highly uniform nanoparticles can be deposited within small structures or islands on and/or within a substrate surface. The structures can individually form devices, such as microelectronic components, that are integrated with other devices to form the article. The formation of the structures involves self-assembly approaches that generate well defined organized deposits of nanoparticles. The self-assembly techniques can be used to directly form the deposits of nanoparticles.

Self-assembly approaches provide the capability of forming arrays in association with a surface, but self-assembly itself does not provide localization for device formation within a boundary along a surface. Thus, a separate localization technique is needed to define devices within boundaries along a surface. Appropriate localization techniques are combined with the self-assembly approaches to form the structures that can serve as individual components, generally within an integrated electronic circuit. The localization approaches can make use of lithography, direct formation approaches or other localization techniques to define the boundaries of the structures. Thus, a patterned substrate is formed onto which devices are assembled by self-assembly. The self-assembled structures can be integrated along with structures formed by conventional chemical and physical deposition techniques. Integrated electronic circuits can include integrated optical components.

The self-assembled structures can be produced using dispersions of nanoparticles and by manipulating the conditions on the surface of the material and in the solution to lead to the desired structure formation. In some embodiments, a linker is used to chemically bind on one end to the substrate surface and on the other end to the nanoparticle. Selective binding with the linker can be used to direct the self-assembly process. Another alternative approach makes use of natural interactions, such as electrostatic and chemical interactions to help direct the self-assembly process. In other alternative approaches, the nanoparticles are deposited within miniature pores to localize the nanoparticles within the boundaries defined by the porous region. Miniature pores are found within certain materials, such as inorganic oxides or two dimensional organic crystals, or suitable pores can be formed, for example, by ion milling or chemical etching. Further details and additional self-assembly approaches are described below.

A. Production of Nanocrystalline/Nanoscale Particles

Laser pyrolysis has been discovered to be a valuable tool for the production of nanoscale inorganic particles, including, in particular, carbon particles, elemental metal particles, metal/silicon oxide particles, metal/silicon carbide particles, metal/silicon nitride particles and metal/silicon sulfide particles. In addition, the particles produced by laser pyrolysis are a convenient material for further heat processing under mild conditions to expand the pathways for the production of desirable inorganic nanoparticles, especially particles with high uniformity. Thus, using laser pyrolysis alone or in combination with additional processes, a wide variety of nanoscale particles can be produced.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce several different nanoparticles in a particular apparatus are referenced below. Furthermore, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of a reactant, such as a reactant serving as an oxygen source, in the reactant stream favors the production of particles with increased amounts of atoms from the secondary reactant.

Reactant flow rate and velocity of the reactant gas stream are inversely related to particle size so that increasing the reactant gas flow rate or velocity tends to result in smaller particle sizes. Also, the growth dynamics of the particles have a significant influence on the size of the resulting particles. In other words, different forms of a product compound have a tendency to form different size particles from other phases under relatively similar conditions. Light intensity/laser power also influences particle size with increased light intensity favoring larger particle formation for lower melting materials and smaller particle formation for higher melting materials.

Laser pyrolysis has been performed generally with gas phase reactants. Many metal/silicon precursor compounds can be delivered into the reaction chamber as a gas. Appropriate metal/silicon precursor compounds for gaseous delivery generally include metal/silicon compounds with reasonable vapor pressures, i.e., vapor pressures sufficient to get desired amounts of precursor vapor in the reactant stream. The vessel holding liquid or solid precursor compounds can be heated to increase the vapor pressure of the metal/silicon precursor, if desired. A carrier gas can be bubbled through a liquid precursor to facilitate delivery of a desired amount of precursor vapor. Similarly, a carrier gas can be passed over the solid precursor to facilitate delivery of the precursor vapor. A suitable container for heating and delivering a solid precursor to a laser pyrolysis apparatus is described below. Solid precursors generally are heated to produce a sufficient vapor pressure.

The use of exclusively gas phase reactants is somewhat limiting with respect to the types of precursor compounds that can be used conveniently. Thus, techniques have been developed to introduce aerosols containing reactant precursors into laser pyrolysis chambers. Improved aerosol delivery apparatuses for reaction systems are described further in commonly assigned and copending U.S. patent application Ser. No. 09/188,670, now U.S. Pat. No. 6,193,936 to Gardner et al., entitled "Reactant Delivery Apparatuses," incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are formed with a solvent present, the solvent preferably is rapidly evaporated by the light beam in the reaction chamber such that a gas phase reaction can take place. Thus, the fundamental features of the laser pyrolysis reaction are unchanged by the presence of an aerosol. Nevertheless, the reaction conditions are affected by the presence of the aerosol. Various references are cited below that present specific conditions for the production of nanoparticles using aerosol precursors. Thus, the parameters associated with aerosol reactant delivery can be explored further based on the description below.

A number of suitable solid, metal/silicon precursor compounds can be delivered as an aerosol from solution. The compounds are dissolved in a solution generally with a concentration greater than about 0.5 molar. Typically, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a preferred solution concentration.

Preferred secondary reactants serving as oxygen source include, for example, $O_2$, CO, $CO_2$, $O_3$ and mixtures thereof. Oxygen can be supplied as air. The secondary reactant compound should not react significantly with the metal/silicon precursor prior to entering the reaction zone since this generally would result in the formation of large particles. Alternative secondary reactants can be selected based on the desired product particles and precursors.

Laser pyrolysis can be performed with a variety of optical frequencies. Preferred light sources operate in the infrared portion of the electromagnetic spectrum. $CO_2$ lasers are particularly preferred sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while this light driven process is referred to as laser pyrolysis, it is not a thermal process even though traditional pyrolysis is a thermal process.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases include, for example, Ar, He and $N_2$.

An appropriate laser pyrolysis apparatus generally includes a reaction chamber isolated from the ambient environment. A reactant inlet connected to a reactant delivery apparatus produces a reactant stream through the reaction chamber. A laser beam path intersects the reactant stream at a reaction zone. The reactant/product stream continues after the reaction zone to an outlet, where the reactant/product stream exits the reaction chamber and passes into a collection apparatus. Generally, the light source, such as a laser, is located external to the reaction chamber, and the light beam enters the reaction chamber through an appropriate window.

Referring to FIG. 1, a particular embodiment 100 of a laser pyrolysis system involves a reactant delivery apparatus 102, reaction chamber 104, shielding gas delivery apparatus 106, collection apparatus 108 and light source 110. A first reaction delivery apparatus described below can be used to deliver exclusively gaseous reactants. An alternative reactant delivery apparatus is described for delivery of one or more reactants as an aerosol.

Figure 2:
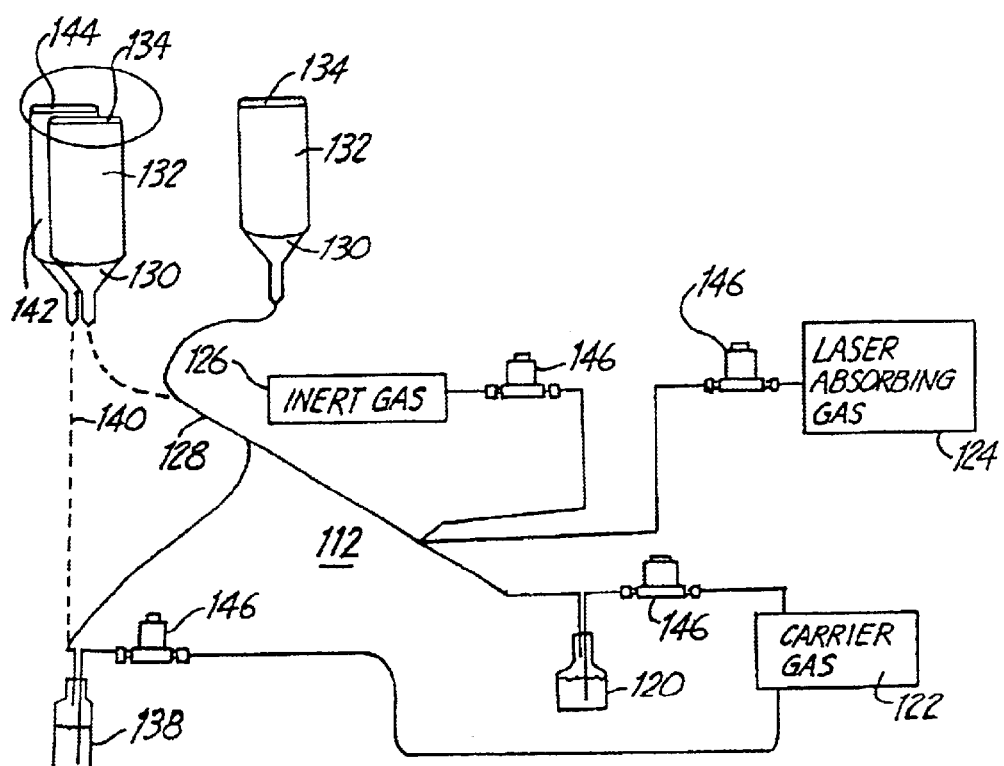
FIG. 2 is a schematic view of a reactant delivery apparatus for the delivery of vapor reactants to the laser pyrolysis apparatus of FIG. 1.

Referring to FIG. 2, a first embodiment 112 of reactant delivery apparatus 102 includes a source 120 of a precursor compound. For liquid or solid reactants, a carrier gas from one or more carrier gas sources 122 can be introduced into precursor source 120 to facilitate delivery of the reactant.

Precursor source 120 can be a liquid holding container, a solid precursor delivery apparatus, as described below, or other suitable container. The carrier gas from carrier gas source 122 preferably is either an infrared absorber and/or an inert gas.

The gases from precursor source 120 are mixed with gases from infrared absorber source 124 and/or inert gas source 126 by combining the gases in a single portion of tubing 128. The gases are combined a sufficient distance from reaction chamber 104 such that the gases become well mixed prior to their entrance into reaction chamber 104. The combined gas in tube 128 passes through a duct 130 into channel 132, which is in fluid communication with reactant inlet 134, which can be part of a multiple inlet delivery apparatus, as shown in phantom lines in FIG. 2.

A second reactant can be supplied from second reactant source 138, which can be a liquid reactant delivery apparatus, a solid reactant delivery apparatus, a gas cylinder or other suitable container or containers. As shown in FIG. 2, second reactant source 138 delivers a second reactant to duct 130 by way of tube 128. Alternatively, second reactant source 138 can deliver the second reactant to tube 140 for delivery through duct 142 to a second reactant inlet 144, as depicted with phantom lines in FIG. 2. Mass flow controllers 146 can be used to regulate the flow of gases within the reactant delivery system of FIG. 2.

Figure 3:
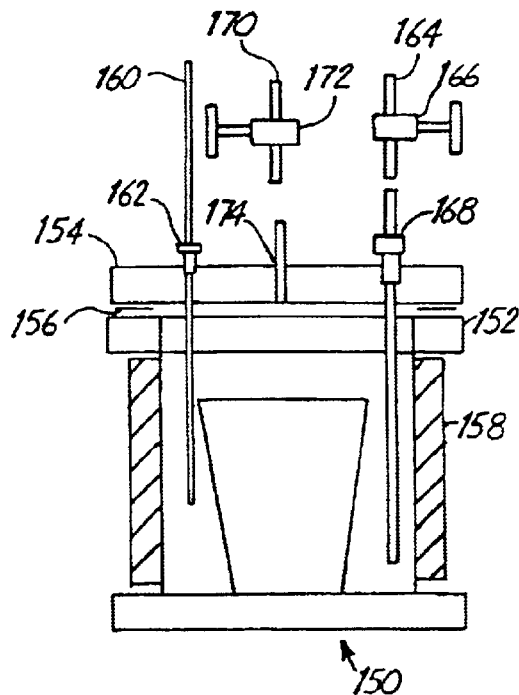
FIG. 3 is a schematic sectional view of a solid precursor delivery system taken through the center of the system.

Referring to FIG. 3, the solid precursor delivery apparatus 150 for vapor delivery includes a container 152 and a lid 154. A gasket 156 is located between container 152 and lid 154. Container 152 is surrounded with a band heater 158, which is used to set the temperature of the delivery apparatus 150 at desired values. Additional portions of the precursor delivery system can be heated to maintain the precursor in a vapor state after it has left container 152.

Preferably, a thermocouple 160 is inserted into container 152 through lid 154. Thermocouple 160 can be inserted by way of a Swagelok® fitting 162 or other suitable connection. Tubing 164 provides a input flow of a carrier gas into container 152. Tubing 164 preferably includes a shut off valve 166 and can be inserted through lid 154 by way of a Swagelok® fitting 168 or other suitable connection. Output tube 170 also preferably includes a shut off valve 172. Output tube 170 preferably enters into container 152 through lid 154 at a sealed connection 174.

As noted above, the reactant stream can include one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 4:
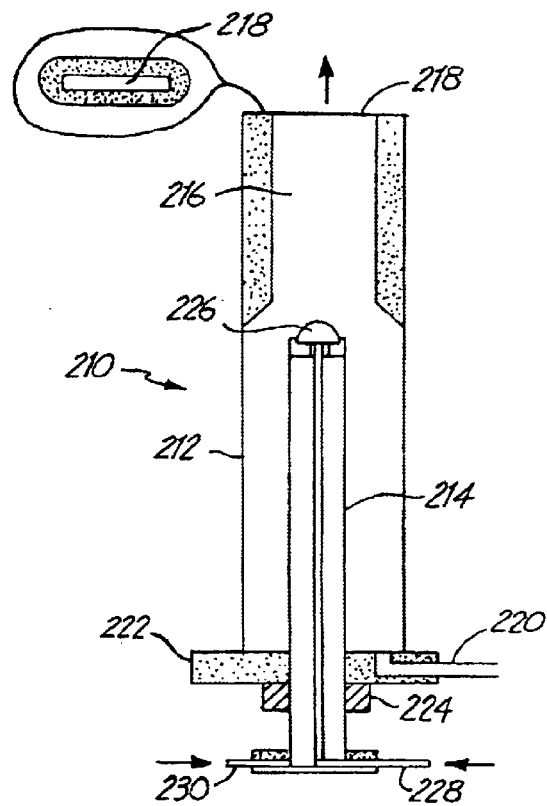
FIG. 4 is schematic, side view of an embodiment of a reactant delivery apparatus for the delivery of an aerosol reactant to the laser pyrolysis apparatus of FIG. 1.

Referring to FIG. 4, another embodiment 210 of the reactant supply system 102 can be used to supply an aerosol to duct 132. Reactant supply system 210 includes an outer nozzle 212 and an inner nozzle 214. Outer nozzle 212 has an upper channel 216 that leads to a rectangular outlet 218 at the top of outer nozzle 212, as shown in the insert in FIG. 4. Rectangular nozzle has selected dimensions to produce a reactant stream of desired expanse within the reaction chamber. Outer nozzle 212 includes a drain tube 220 in base plate 222. Drain tube 220 is used to remove condensed aerosol from outer nozzle 212. Inner nozzle 214 is secured to outer nozzle 212 at fitting 224.

The top of the nozzle preferably is a twin orifice internal mix atomizer 226. Liquid is fed to the atomizer through tube 228, and gases for introduction into the reaction chamber are fed to the atomizer through tube 230. Interaction of the gas with the liquid assists with droplet formation.

The reaction chamber 104 includes a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) or inlets 256, 258 (right lower insert) for the passage of reactants to form a reactant stream in the reaction chamber. Reactant inlets 256, 258 preferably are slits, as shown in the lower inserts of FIG. 1. Annular opening 254 has, for example, a diameter of about 1.5 inches and a width along the radial direction from about ⅛ in to about ¹⁄₁₆ in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 include ZnSe windows 264, 266, respectively. Windows 264, 266 are about 1 inch in diameter. Windows 264, 266 are preferably cylindrical lenses with a focal length equal to the distance between the center of the chamber to the surface of the lens to focus the light beam to a point just below the center of the nozzle opening. Windows 264, 266 preferably have an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106.

Referring to FIG. 1, shielding gas delivery system 106 includes inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 preferably is controlled by a mass flow controller 288.

Light source 110 is aligned to generate a light beam 300 that enters window 264 and exits window 266. Windows 264, 266 define a light path through main chamber 250 intersecting the flow of reactants at reaction zone 302. After exiting window 266, light beam 300 strikes power meter 304, which also acts as a beam dump. An appropriate power meter is available from Coherent Inc., Santa Clara, Calif. Light source 110 can be a laser or an intense conventional light source such as an arc lamp. Preferably, light source 110 is an infrared laser, especially a CW $CO_2$ laser such as an 1800 watt maximum power output laser available from PRC Corp., Landing, N.J.

Reactants passing through reactant inlet 256 in injection nozzle 252 initiate a reactant stream. The reactant stream passes through reaction zone 302, where reaction involving the metal precursor compounds takes place. Heating of the gases in reaction zone 302 is extremely rapid, roughly on the order of $10^5$ degree C/sec depending on the specific conditions. The reaction is rapidly quenched upon leaving reaction zone 302, and particles 306 are formed in the reactant/product stream. The nonequilibrium nature of the process allows for the production of nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. The preferred chamber pressure for the production of the desired oxides generally ranges from about 80 Torr to about 650 Torr.

Collection system 108 preferably includes a curved channel 330 leading from collection nozzle 310. Because of the small size of the particles, the product particles follow the flow of the gas around curves. Collection system 108 includes a filter 332 within the gas flow to collect the product particles. Due to curved section 330, the filter is not supported directly above the chamber. A variety of materials such as Teflon® (polytetrafluoroethylene), glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® filters from AF Equipment Co., Sunnyvale, Calif.

Pump 334 is used to maintain collection system 108 at a selected pressure. It may be desirable to flow the exhaust of the pump through a scrubber 336 to remove any remaining reactive chemicals before venting into the atmosphere.

The pumping rate is controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus is controlled by a computer 350. Generally, the computer controls the light source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

An alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one preferred embodiment of a commercial capacity laser pyrolysis apparatus, the reaction chamber is elongated along the light beam to provide for an increase in the throughput of reactants and products. The original design of the apparatus was based on the introduction of purely gaseous reactants. The embodiments described above for the delivery of aerosol reactants can be adapted for the elongated reaction chamber design. Additional embodiments for the introduction of an aerosol with one or more aerosol generators into an elongated reaction chamber is described in commonly assigned and copending U.S. patent application Ser. No. 09/188,670, now U.S. Pat. No. 6,193,936 to Gardner et al., entitled "Reactant Delivery Apparatuses," incorporated herein by reference.

In general, the laser pyrolysis apparatus with the elongated reaction chamber is designed to reduce contamination of the chamber walls, to increase the production capacity and to make efficient use of resources. To accomplish these objectives, the elongated reaction chamber provides for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the laser energy.

Figure 5:
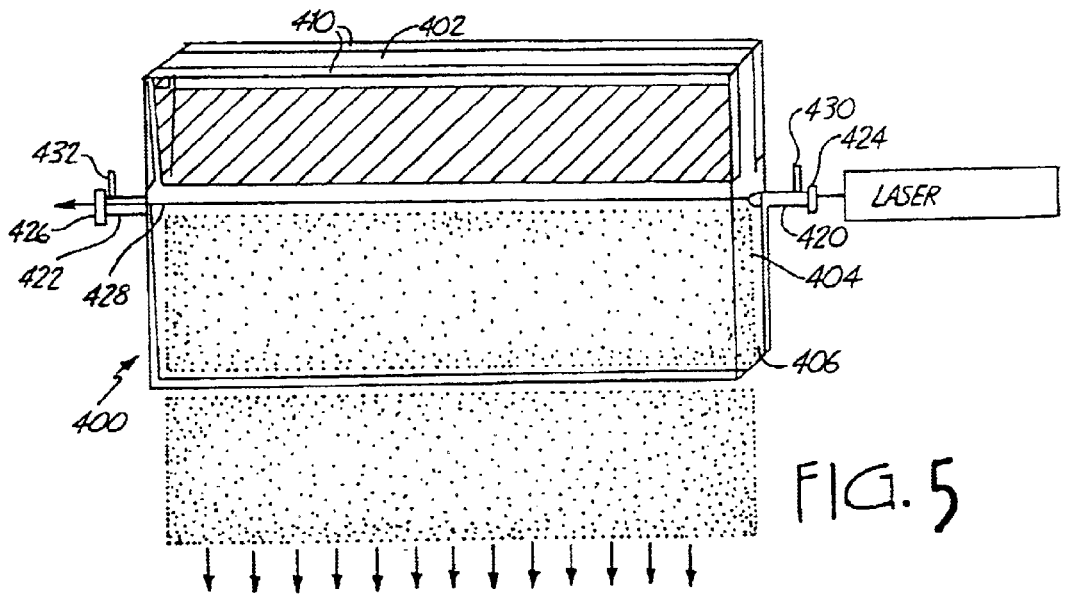
FIG. 5 is a schematic, perspective view of a reaction chamber of an alternative embodiment of the laser pyrolysis apparatus, where the materials of the chamber are depicted as transparent to reveal the interior of the apparatus.

The design of the improved reaction chamber 400 is shown schematically in FIG. 5. A reactant inlet 402 leads to main chamber 404. Reactant inlet 402 conforms generally to the shape of main chamber 404. Main chamber 404 includes an outlet 406 along the reactant/product stream for removal of particulate products, any unreacted gases and inert gases. Shielding gas inlets 410 are located on both sides of reactant inlet 402. Shielding gas inlets are used to form a blanket of inert gases on the sides of the reactant stream to inhibit contact between the chamber walls and the reactants or products. The dimensions of elongated reaction chamber 404 and reactant inlet 402 preferably are designed for high efficiency particle production. Reasonable dimensions for reactant inlet 402 for the production of ceramic nanoparticles, when used with a 1800 watt $CO_2$ laser, are from about 5 mm to about 1 meter.

Tubular sections 420, 422 extend from the main chamber 404. Tubular sections 420, 422 hold windows 424, 426 to define a light beam path 428 through the reaction chamber 400. Tubular sections 420, 422 can include inert gas inlets 430, 432 for the introduction of inert gas into tubular sections 420, 422.

The improved reaction system includes a collection apparatus to remove the nanoparticles from the reactant stream. The collection system can be designed to collect particles in a batch mode with the collection of a large quantity of particles prior to terminating production. Alternatively, the collection system can be designed to run in a continuous production mode by switching between different particle collectors within the collection apparatus or by providing for removal of particles without exposing the collection system to the ambient atmosphere. A preferred embodiment of a collection apparatus for continuous particle production is described in copending and commonly assigned U.S. patent application Ser. No. 09/107,729, now U.S. Pat. No. 6,270,732 to Gardner et al., entitled "Particle Collection Apparatus And Associated Methods," incorporated herein by reference. The collection apparatus can include curved components within the flow path similar to curved portion of the collection apparatus shown in FIG. 1.

B. Heat Treatment of Nanoparticles

As noted above, properties of nanoparticles can be modified by heat processing. Suitable starting material for the heat treatment include nanoparticles, produced by laser pyrolysis. In addition, nanoparticles used as starting material can have been subjected to one or more prior heating steps under different conditions. For the heat processing of nanoparticles formed by laser pyrolysis, the additional heat processing can improve the crystallinity, remove contaminants, such as elemental carbon, and possibly alter the stoichiometry, for example, by incorporation of additional oxygen or of atoms from other gaseous or nongaseous compounds.

The nanoparticles are preferably heated in an oven or the like to provide generally uniform heating. The processing conditions generally are mild, such that significant amounts of particle sintering does not occur. Thus, the temperature of heating preferably is low relative to the melting point of both the starting material and the product material. If the heat treatment involves a compositional change, particle size and morphology may be changed even with mild heating temperatures.

The atmosphere over the particles can be static, or gases can be flowed through the system. The atmosphere for the heating process can be an oxidizing atmosphere, a reducing atmosphere or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, $CO$, $CO_2$, and combinations thereof. The $O_2$ can be supplied as air. Reducing gases include, for example, $H_2$. Oxidizing gases or reducing gases optionally can be mixed with inert gases such as Ar, He and $N_2$. When inert gas is mixed with the oxidizing/reducing gas, the gas mixture can include from about 1 percent oxidizing/reducing gas to about 99 percent oxidizing/reducing gas, and more preferably from about 5 percent oxidizing/reducing gas to about 99 percent oxidizing/reducing gas. Alternatively, either essentially pure oxidizing gas, pure reducing gas or pure inert gas can be used, as desired. Care must be taken with respect to the prevention of explosions when using highly concentrated reducing gases.

The precise conditions can be altered to vary the type of nanoparticles that are produced. For example, the temperature, time of heating, heating and cooling rates, the gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

Figure 6:
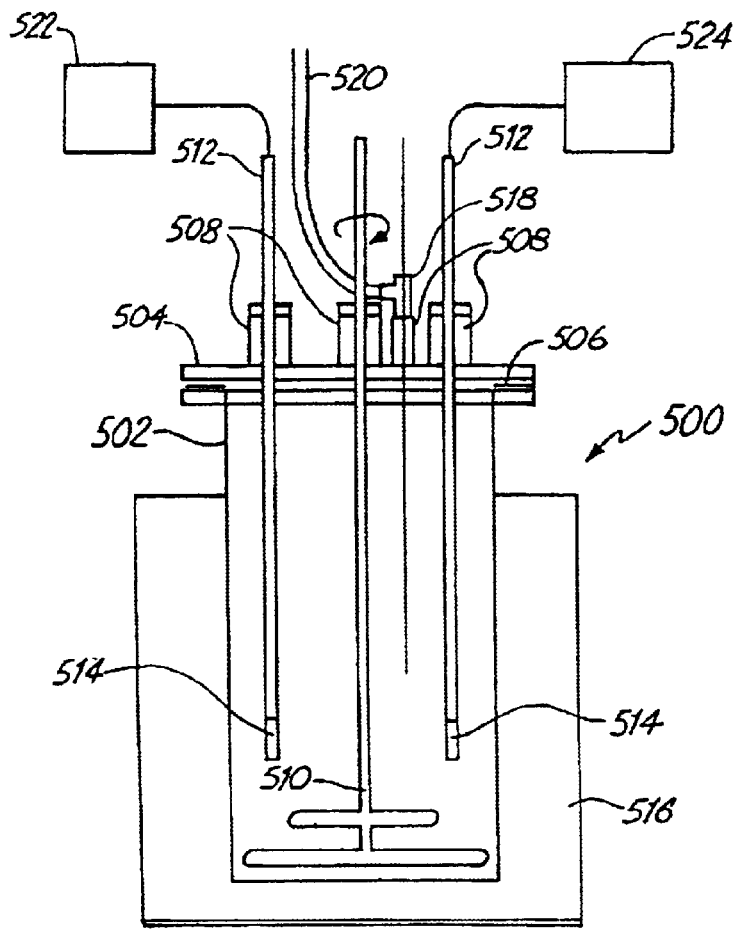
FIG. 6 is a schematic, sectional view of an apparatus for heat treating nanoparticles, in which the section is taken through the center of the apparatus.

A variety of ovens or the like can be used to perform the heating. An example of an apparatus 500 to perform this processing is displayed in FIG. 6. Apparatus 500 includes a jar 502, which can be made from glass or other inert material, into which the particles are placed. Suitable glass reactor jars are available from Ace Glass (Vineland, N.J.). The top of glass jar 502 is sealed to a glass cap 504, with a Teflon® gasket 506 between jar 502 and cap 504. Cap 504 can be held in place with one or more clamps. Cap 504 includes a plurality of ports 508, each with a Teflon® bushing. A multiblade stainless steel stirrer 510 preferably is inserted through a central port 508 in cap 504. Stirrer 510 is connected to a suitable motor.

One or more tubes 512 are inserted through ports 508 for the delivery of gases into jar 502. Tubes 512 can be made from stainless steel or other inert material. Diffusers 514 can be included at the tips of tubes 512 to disburse the gas within jar 502. A heater/furnace 516 generally is placed around jar 502. Suitable resistance heaters are available from Glas-col (Terre Haute, Ind.). One port preferably includes a T-connection 518. The temperature within jar 502 can be measured with a thermocouple 518 inserted through T-connection 518. T-connection 518 can be further connected to a vent 520. Vent 520 provides for the venting of gas circulated through jar 502. Preferably vent 520 is vented to a fume hood or alternative ventilation equipment.

Preferably, desired gases are flowed through jar 502. Tubes 512 generally are connected to an oxidizing gas source and/or an inert gas source. Oxidizing gas, inert gas or a combination thereof to produce the desired atmosphere are placed within jar 502 from the appropriate gas source(s). Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

For the processing of nanoparticles the temperatures generally range from about 50° C. to about 600° C. The heating generally is continued for greater than about 5 minutes, and typically is continued for from about 1 hour to about 120 hours. Preferred heating temperatures and times will depend on the particular starting material and target product. Some empirical adjustment may be required to produce the conditions appropriate for yielding a desired material. The use of mild conditions avoids interparticle sintering resulting in larger particle sizes. Some controlled sintering of the particles can be performed at somewhat higher temperatures to produce slightly larger, average particle diameters.

The conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are described in U.S. Pat. No. 5,989,514, to Bi et al., entitled "Processing of Vanadium Oxide Particles With Heat," incorporated herein by reference. Conditions for the removal of carbon coatings from metal oxide nanoparticles are described in U.S. patent application Ser. No. 09/123,255, now U.S. Pat. No. 6,387,531 entitled "Metal (Silicon) Oxide/Carbon Composite Particles," incorporated herein by reference. The incorporation of lithium from a lithium salt into metal oxide nanoparticles in a heat treatment process is described in copending and commonly assigned U.S. patent application Ser. No. 09/311,506, now U.S. Pat. No. 6,394,494 to Reitz et al., entitled "Metal Vanadium Oxide Particles," and copending and commonly assigned U.S. patent application Ser. No. 09/334,203, now U.S. Pat. No. 6,482,374 to Kumar et al., entitled "Reaction Methods for Producing Ternary Particles," both of which are incorporated herein by reference.

C. Properties of the Particles

A collection of particles of interest generally has an average diameter for the primary particles of less than about 500 nm, preferably from about 2 nm to about 100 nm, alternatively from about 5 nm to about 75 nm, or from about 5 nm to about 50 nm. In some embodiments, the average particles sizes range from about 12 nm to about 100 nm and in other embodiments from about 15 nm to about 50 nm.

Particle diameters are evaluated by transmission electron microscopy. Preferred particles comprise elemental metal, a metal/silicon oxide, a metal/silicon nitride, a metal/silicon sulfide, a metal/silicon carbide or carbon particles.

The primary particles usually have a roughly spherical gross appearance. Upon closer examination, crystalline particles generally have facets corresponding to the underlying crystal lattice. Nevertheless, crystalline primary particles tend to exhibit growth that is roughly equal in the three physical dimensions to give a gross spherical appearance. Amorphous particles generally have an even more spherical aspect. In preferred embodiments, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. These agglomerates can be dispersed to a significant degree, as described further below. The secondary or agglomerated particle size depends on the subsequent processing of the particles following their initial formation and the composition and structure of the particles. In preferred embodiments, the secondary particles have an average diameter from about 20 nm to about 400 nm.

Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent, and preferably 99 percent, of the primary particles have a diameter greater than about 60 percent of the average diameter and less than about 140 percent of the average diameter.

Furthermore, in preferred embodiments no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. The nanoparticles produced by the above described methods are expected to have a purity greater than the reactants because the laser pyrolysis reaction and, when applicable, the crystal formation process tends to exclude contaminants from the particle. Furthermore, crystalline nanoparticles produced by laser pyrolysis have a high degree of crystallinity. Similarly, the crystalline nanoparticles produced by heat processing have a high degree of crystallinity. Impurities on the surface of the particles may be removed by heating the particles to achieve not only high crystalline purity but high purity overall.

Several different types of nanoscale electroactive particles have been produced by laser pyrolysis with or without additional heat processing. These particles generally have a very narrow particle size distribution, as described above.

In particular, the production of vanadium oxide nanoparticles is described in copending and commonly assigned U.S. patent applications Ser. No. 08/897,778, now U.S. Pat. No. 6,106,798 to Bi et al., entitled "Vanadium Oxide Nanoparticles," incorporated here by referee. Similarly, silver vanadium oxide nanoparticles have been produced, as described in copending and commonly assigned U.S. patent applications Ser. No. 09/246,076, now U.S. Pat. Nos. 6,225,007, and Ser. No. 09/311,506, now U.S. Pat. No. 6,394,494, both entitled "Metal Vanadium Oxide Particles," both of which are incorporated herein by reference.

Also, nanoscale manganese oxide particles have been formed by laser pyrolysis. The production of these particles is described in copending and commonly assigned U.S. patent application Ser. No. 09/188,770, now U.S. Pat. No. 6,506,493, entitled "Metal Oxide Particles," incorporated herein by reference. This application describes the production of MnO, $Mn_2O_3$, $Mn_3O_4$ and $Mn_5O_8$.

Furthermore, lithium manganese oxide nanoparticles have been produced by laser pyrolysis along with subsequent heat processing, as described in copending and commonly assigned U.S. patent applications Ser. No. 09/188,768, now U.S. Pat. No. 6,607,706, entitled "Composite Metal Oxide Particles," Ser. No. 09/203,414, now U.S. Pat. No. 6,136,287, entitled "Lithium Manganese Oxides and Batteries," and 09/334,203, now U.S. Pat. No. 6,482,374 to Kumar et al., entitled "Reaction Methods for Producing Ternary Particles," all three of which are incorporated herein by reference.

The production of silicon oxide nanoparticles is described in copending and commonly assigned U.S. patent application Ser. No. 09/085,514, now U.S. Pat. No. 6,726,990 to Kumar et al. entitled "Silicon Oxide Particles," incorporated herein by reference. This patent application describes the production of amorphous $SiO_2$. The synthesis by laser pyrolysis of silicon carbide and silicon nitride is described in copending and commonly assigned U.S. patent application Ser. No. 09/433,202 to Reitz et al. filed on Nov. 5, 1999, entitled "Particle Dispersions," incorporated herein by reference.

The production of titanium oxide nanoparticles is described in copending and commonly assigned, U.S. patent application Ser. No. 09/123,255, now U.S. Pat. No. 6,387,531 to Bi et al., entitled "Metal (Silicon) Oxide/Carbon Composites," incorporated herein by reference. In particular, this application describes the production of anatase and rutile $TiO_2$. The production of aluminum oxide nanoparticles is described in copending and commonly assigned, U.S. patent application Ser. No. 09/136,483 to Kumar et al., entitled "Aluminum Oxide Particles," incorporated herein by reference. In particular, this application disclosed the production of $\gamma$-$Al_2O_3$. Suitable liquid, aluminum precursors with sufficient vapor pressure of gaseous delivery include, for example, aluminum s-butoxide (Al$(OC_4H_9)_3$). Also, a number of suitable solid, aluminum precursor compounds are available including, for example, aluminum chloride ($AlCl_3$), aluminum ethoxide (Al$(OC_2H_5)_3$), and aluminum isopropoxide (Al$[OCH(CH_3)_2]_3$).

In addition, tin oxide nanoparticles have been produced by laser pyrolysis, as described in copending and commonly assigned U.S. patent application Ser. No. 09/042,227, now U.S. Pat. No. 6,099,798 to Kumar et al., entitled "Tin Oxide Particles," incorporated herein by reference. The production of zinc oxide nanoparticles is described in copending and commonly assigned U.S. patent application Ser. No. 09/266,202 to Reitz, entitled "Zinc Oxide Particles," incorporated herein by reference. In particular, the production of ZnO nanoparticles is described.

The production of iron and iron carbide is described in a publication by Bi et al., entitled "Nanocrystalline $\alpha$-Fe, $Fe_3C$, and $Fe_7C_3$ produced by $CO_2$ laser pyrolysis," J. Mater. Res. Vol. 8, No. 7 1666–1674 (July 1993), incorporated herein by reference. The production of iron oxide nanoparticles is described in copending and commonly assigned U.S. patent application Ser. No. 09/337,826, now U.S. Pat. No. 6,080,337 to Kambe et al., entitled "Iron Oxide Particles," incorporated herein by reference. The production of nanoparticles of silver metal is described in copending and commonly assigned U.S. patent application Ser. No. 09/311,506 to Reitz et al., entitled "Metal Vanadium Oxide Particles," incorporated herein by reference. Nanoscale carbon particles produced by laser pyrolysis are described in a reference by Bi et al., entitled "Nanoscale carbon blacks produced by $CO_2$ laser pyrolysis," J. Mater. Res. Vol. 10, No. 11, 2875–2884 (November 1995), incorporated herein by reference.

The production of iron sulfide ($Fe_{1-x}S$) nanoparticles by laser pyrolysis is described in Bi et al., Material Research Society Symposium Proceedings, vol. 286, p. 161–166 (1993), incorporated herein by reference. Precursors for laser pyrolysis production of iron sulfide were iron pentacarbonyl (Fe$(CO)_5$) and hydrogen sulfide ($H_2S$).

Cerium oxide can be produced using the laser pyrolysis apparatuses described above. Suitable precursors for aerosol delivery include, for example, cerous nitrate (Ce$(NO_3)_3$), cerous chloride ($CeCl_3$) and cerous oxalate ($Ce_2(C_2O_4)_3$). Similarly, zirconium oxide can be produced using the laser pyrolysis apparatuses described above. Suitable zirconium precursors for aerosol delivery include, for example, zirconyl chloride ($ZrOCl_2$) and zirconyl nitrate (ZrO$(NO_3)_2$).

The production of ternary nanoparticles of aluminum silicate and aluminum titanate can be performed by laser pyrolysis following procedures similar to the production of silver vanadium oxide nanoparticles described in copending and commonly assigned U.S. patent application Ser. No. 09/311,506, now U.S. Pat. No. 6,394,494 to Reitz et al., entitled "Metal Vanadium Oxide Particles," incorporated herein by reference. Suitable precursors for the production of aluminum silicate include, for vapor delivery, a mixture of aluminum chloride ($AlCl_3$) and silicon tetrachloride ($SiCl_4$) and, for aerosol delivery, a mixture of tetra(N-butoxy) silane and aluminum isopropoxide (Al$(OCH(CH_3)_2)_3$). Similarly, suitable precursors for the production of aluminum titanate include, for aerosol delivery, a mixture of aluminum nitrate (Al$(NO_3)_3$) and titanium dioxide ($TiO_2$) powder dissolved in sulfuric acid or a mixture of aluminum isopropoxide and titanium isopropoxide (Ti$(OCH(CH_3)_2)_4$).

D. Particle Dispersions

Generally, a collection of nanoparticles must be dispersed for introduction into a self-assembly process. In some circumstances, it may be sufficient to disperse the particles as a powder in a gas. If the particles have surface properties that resist agglomeration, a dispersion of particles in an inert gas, such as argon, nitrogen or possibly air, may be delivered to the self-assembly location as primary particles or uniform, small secondary particles. In particular, particles formed from non-magnetic materials and material with non-reactive surfaces would be expected would be expected to be suitable for dispersion in inert gases. Similarly, it may be suitable to deliver the particles directly from the gas stream flowing from the particle production apparatus. Such a gas stream can include, for example, inert gases, gaseous reaction products and unreacted reactants.

Alternatively, a liquid phase particle dispersion can provide a source of small secondary particles that can be used in the formation of structures in the self-assembly process. Once the dispersion is delivered at the self-assembly location, the liquid can be removed or solidified to leave behind a structure formed from small secondary particles at a desired location as determined by the self-assembly process.

The qualities of a liquid dispersion generally depend on the concentration of particles, the composition of the dispersion and the formation of the dispersion. Specifically, the degree of dispersion intrinsically depends on the interparticle interactions, the interactions of the particles with the liquid and the surface chemistry of the particles. Both entropic and energetic consideration may be involved. The degree of dispersion and stability of the dispersion can be significant features for the production of small devices especially for industrial applicability.

Generally, the liquid dispersions described herein refer to dispersions having particle concentrations of no more than about 80 weight percent. For the formation of a particle dispersion, the particular particle concentration depends on the selected application. At concentrations greater than about 50 weight percent, different factors can be significant with respect to the formation and characterization of the resulting viscous blend relative to parameters that characterize the more dilute particle dispersions. The concentration of particles affects the viscosity and can effect the efficacy of the dispersion process. In particular, high particle concentrations can increase the viscosity and make it more difficult to disperse the particles to achieve small secondary particle sizes, although the application of shear can assist with particle dispersion.

The composition of the dispersion depends on the composition of the dispersant and the nanoparticles. Suitable dispersants include, for example, water, organic solvents, such as alcohols and hydrocarbons, and combinations thereof. The selection of preferred solvents generally depends on the properties of the nanoparticles. Thus, the dispersant and the nanoparticles should be selected to be compatible for the formation of well dispersed particles. For example, gamma alumina particles generally are dispersed well at acidic pH values of about 3–4, and silica particles generally are dispersed well at basic pH values from 9–11. Generally, nanoparticles with little surface charge can be dispersed preferentially in less polar solvents. Thus, hydrophobic particles can be dispersed in nonaqueous solvents or aqueous solutions with less polar cosolvents, and hydrophilic particles can be dispersed in aqueous solvent.

In addition, the dispersions can include additional compositions, such as surfactants, buffers and salts. For particular particles, the properties of the dispersion can be adjusted by varying the pH and/or the ionic strength. Ionic strength can be varied by addition of inert salts, such as sodium chloride, potassium chloride or the like. The pH generally effects the surface charge of the dispersed particles. The minimum surface charge is obtained at pH value of the isoelectric point. A decrease in surface charge can result in further agglomeration. Also, the amount of surface charge can effect the self-assembly process, as described below. Thus, it may be useful to select the pH to yield a desired amount of surface charge based on subsequent processing steps.

The liquid may apply physical/chemical forces in the form of solvation-type interactions to the particles that may assist in the dispersion of the particles. Solvation-type interactions can be energetic and/or entropic in nature. Additional compositions, such as surfactants, can be added to the liquid to assist with the dispersion for the particles. Suitable surfactants include, for example, octoxynol (sold as Triton® X), nonxynol (sold as Doxfax® 9N and Triton® N) and dodecyltrimethyl ammonium bromide (C12 TAB, $CH_3(CH_2)_{11}N(CH_3)_3Br$).

The qualities of the dispersion generally depend on the process for the formation of the dispersion. In particular, the degree of mixing, i.e., the amount of shear forces, applied to the dispersion significantly influences the properties of the dispersion. In dispersions, besides chemical/physical forces applied by the dispersant and other compounds in the dispersion, mechanical forces can be used to separate the primary particles, which are held together by van der Waals forces and other short range electromagnetic forces between adjacent particles. Mechanical forces can be applied to the powders prior to dispersion in a solvent. Alternatively, mechanical forces, such as shear stress, can be applied as mixing, agitation, jet stream collision and/or sonication following the combination of a powder or powders and a liquid or liquids.

The secondary particle size refers to the size of the resulting particle agglomerates following dispersion of the powders in the gas or liquid. Smaller secondary particles sizes are obtained if there is more disruption of the agglomerating forces between the primary particles. Secondary particles sizes equal to the primary particle sizes can be accomplished with at least some nanoparticles if the interparticle forces can be sufficiently disrupted. The use of surfactants and high shear stress can assist with obtaining smaller secondary particle sizes.

Secondary particles sizes within a gaseous or liquid dispersion can be measured by established approaches, such as dynamic light scattering. Suitable particle size analyzers include, for example, a Microtrac UPA instrument from Honeywell based on dynamic light scattering and ZetaSizer Series of instruments from Malvern based on Photon Correlation Spectroscopy. The principles of dynamic light scattering for particle size measurements in liquids are well established.

The presence of small secondary particle sizes can result in significant advantages in the application of the dispersions for the formation of surface structures on a substrate. For example, smaller secondary particle sizes, and generally small primary particle sizes, may assist with the formation of smoother and/or smaller and more uniform structures by way of the self-assembly process. In the formation of coatings, thinner and smoother coatings can be formed with a dispersion having smaller secondary particles. In preferred embodiments, the average secondary particle diameter is less than about 1000 nm, preferably less than about 500 nm, more preferably from about 2 nm to about 300 nm, even more preferably from about 2 nm to about 200 nm and even more preferably from about 2 nm to about 100 nm. In some embodiments, the average secondary particle diameters range from about 12 nm to about 200 nm or from about 15 nm to about 200 nm.

Once the dispersion is formed, the dispersion may eventually separate such that the particles collect on the bottom of the container without continued mechanical stirring or agitation. Stable dispersions have particles that do not separate out of the dispersion. Different dispersions have different degrees of stability. The stability of a dispersion depends on the properties of the particles, the other compositions in the dispersion, the processing used to form the dispersion and the presence of stabilizing agents. Suitable stabilizing agents include, for example, surfactants. Preferably, dispersions are reasonably stabile, such that the dispersions can be used without significant separation during the subsequent processing steps. The required stability of a dispersion depends on the particular application.

E. Self-Assembled Structures with Nanoparticles

Self-assembled structures are generated on and/or within the surface of a material/substrate. In preferred embodiments, the self-assembled structures are localized within boundaries, such that the structures form localized islands. In this way, each structure can form an element as a component of a multiple element circuit or instrument. In particular, each structure can be a component of an integrated electronic circuit, which can include, for example, electrical components, optical devices and photonic crystals.

To form the structure within the prescribed boundaries, the production of the self-assembled structures of interest generally requires a process defining the extent of the structure and a separate self-assembly process. The boundary defining process generally utilizes external forces to define the extent of the structures. The self-assembly process itself generally does not define the boundaries of the structure. Self-assembly is based on a natural sensing function of the compositions/materials that results in a natural ordering within the resulting structure as the compositions/materials associate. In general, the localization step can be performed before or after the self-assembly process, although the nature of the processing steps may dictate a particular order. The net effect results in a self-assembled structure with a corresponding coverage of nanoparticles within the boundary and an area outside of the boundary lacking this coverage.

The separate boundary defining process is coupled to the self-assembly process by activating the self-assembly process within the boundaries or by deactivating the area outside of the boundaries. Generally, an outside force must be applied to perform the activation or deactivation process. The localization can be performed using a mask or the like, or using maskless lithography with focused radiation, such as an electron beam, an ion beam or a light beam.

In combination with a boundary defining process, self-assembly provides a powerful way of generating well defined structures that can have small extents. The self-assembly process form an ordered array or a random array of nanoparticles associated with the surface of a substrate.

Self-assembly provides for the efficient formation of devices suitable for a very wide range of materials. For example, a variety of very uniform nanoparticles have been described above that can be formed into structures using the self-assembly techniques described herein in combination with external forces applied to define the extent of the self-assembled structure. In preferred embodiments, the assembled structures form a microscopic configuration with two dimensional or three dimensional features that are integrated to form a complete integrated article. The term "nanoscopic" is used to refer to structure within an individual self-assembled device. The resulting three dimensional structure forms a superlattice or superstructure.

Figure 7:
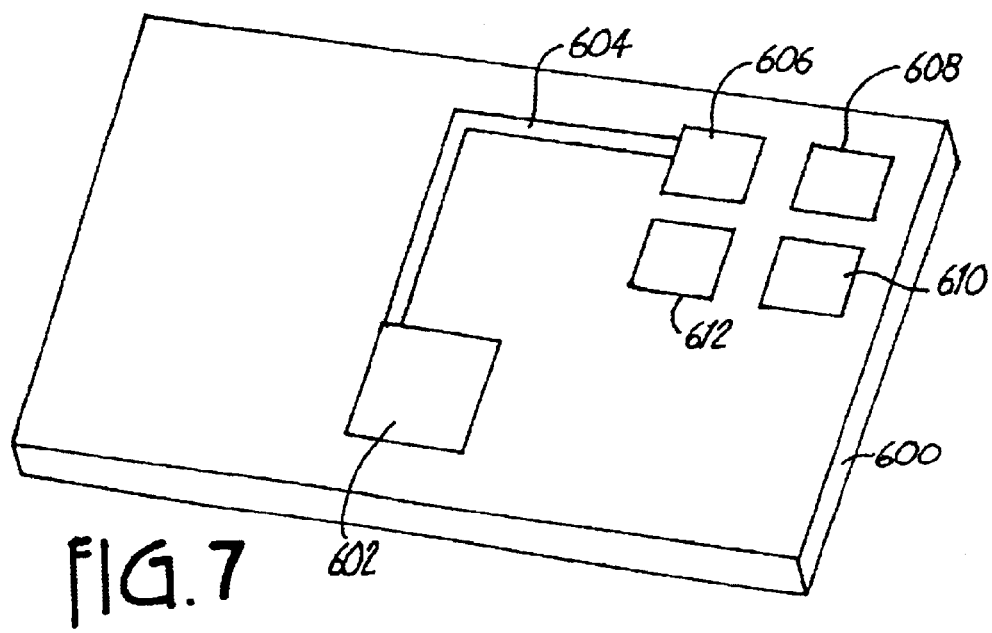
FIG. 7 is a schematic, top plan view of a substrate surface with islands of self-assembled inorganic particles.

Examples of structures placed along a substrate by the processes described herein is shown in FIG. 7. Referring to FIG. 7, a substrate 600 includes structures or islands of self-assembled particles 602, 604, 606, 608, 610, 612. Each surface structure 602–612 includes a functional composition. In preferred embodiments, the functional composition comprises a plurality of nanoscale particles. Preferred nanoscale particles have a narrow particle size distribution of primary particles, such as the nanoparticles described above. Similarly, preferred nanoscale particles have a small average secondary particle size, generally resulting from the use of a preferred particle dispersion, as described above, in the self-assembly process. Other suitable compositions include inorganic compositions, organic compositions. Suitable organic compositions include, for example, biological macromolecules, such as proteins, carbohydrates, nucleic acids and combinations thereof.

The precise structure of the nanoparticles within each structure 602–612 will depend on the self-assembly process used to produce the structure, as described further below. In particular, for embodiments based on nanoparticles, the particles may not be uniformly distributed across the extent of the structure since the particles may be in an ordered or random array within the structure. However, each structure has distinct boundaries along the extend of the substrate surface that are defined by portions of the surface lacking any significant numbers of particles extending over at least a significant fraction of the structures diameter beyond the boundary.

While the structures are depicted in FIG. 7 as being at the same level along the material surface, structures can be located along different levels relative to a plane within the material, as required for functional considerations. Thus, self-assembled structures can be at or near the surface of the material or within the material at an appropriate depth. Different devices within the material or at its surface can be integrated within the strata with the device and/or between different strata.

The structures have a spacial extent covering an area along a plane parallel to the surface of the material. The rough spacial dimensions of each structure can be referenced relative to a maximum diameter and minimum diameter with respect to line segments extending from the edges of the structure through the center of the structure. If the function of the device suggests larger structures, these devices, such as batteries, can have dimensions on the order of millimeters or larger. Other structures can include dimensions with respect to minimum diameters through the center less than about ten microns, in some embodiments less than about 1 micron, in other embodiments less than about 0.25 microns, in still other embodiments less than about 0.13 microns and in further embodiments, less than about 0.10 microns. The "height" relative to the substrate surface and texture along the structures generally is determined by the self-assembly technique. The structures have a thickness appropriate for the function of the device and influenced by the self-assembly process. In embodiments involving embedded structures in a single plane, the structures have a thickness less than about 2000 nanometers, generally less than about 250 nanometers, in some embodiments less than about 100 nanometers and in still other embodiments from about 5 nm to about 50 nanometers.

Figure 8:
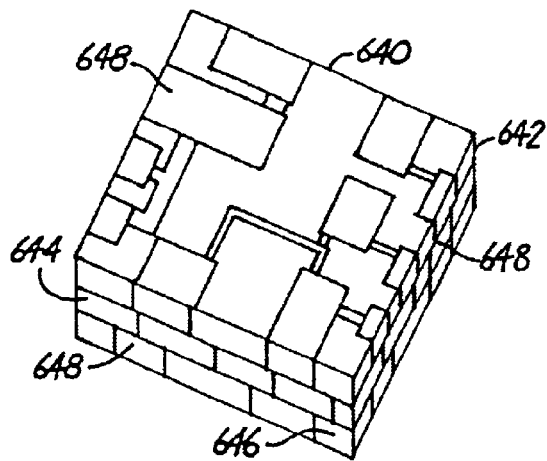
FIG. 8 is a schematic prospective view of a multiple layer integrated electrical circuit including self-assembled devices.
Figure 9:
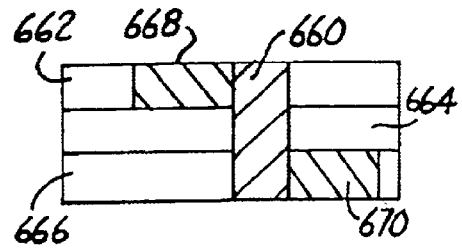
FIG. 9 is a side view of an interconnect spanning three layers of a multiple layer integrated electrical circuit.

The integrated structure can be a stacked structure comprising several vertically integrated layers, as shown in FIG. 8. Referring to FIG. 8, integrated superstructure or superlattice 640 includes three layers 642, 644, 646. Each layer generally includes a plurality of integrated devices 648. One or more devices can include self-assembled materials. In addition, self-assembled structures can be used for form interconnects between layers. Referring to FIG. 9, an interlayer interconnect 660 formed with self-assembled materials spans three layers 662, 664, 666. Interlayer interconnect 660 can be an electrical conductor or it can have other functional characteristics.

The structures, i.e., device or component thereof, are located on and/or within the surface of the material according to function, with appropriate interconnects to other elements or devices. The composition of the nanoparticles or other compositions assembled within a particular structure are selected based on the function of the structure. Suitable structures incorporating nanoparticles or other self-assembled compositions include, for example, energy sources, such as batteries; photonic crystals; active electrical or electro-optical elements, such as field emission devices; and passive elements, such as electrical interconnects, barrier layers and insulating layers. Battery electrodes can be formed with self-assembled electroactive particles along with electrically conductive particles. The formation of small batteries from nanoparticles, generally, is discussed further in copending and commonly assigned U.S. patent application Ser. No. 09/435,748 to Buckley et al., entitled "Electrodes," incorporated herein by reference.

Photonic crystals are ordered arrays of crystalline particles having a unit cell size of the photonic crystal ranging from about one quarter to about one optical wavelength. For example, visible light has a wavelength of about 380 nm to about 780 nm. Generally, photonic crystals of interest have size from about 100 nm to about 1000 nm. The photonic crystals can be formed from an ordered array of crystalline nanoparticles of, for example, silica, titania or zinc oxide. Due to the size of the ordered arrays, the photonic crystals can have a photonic band gap that prevents propagation of light in any direction. Thus, photonic crystals can be used for control of spontaneous emission and for very sharp bending of light.

Electrical interconnects can be constructed from electrically conductive particles, for example, metal nanoparticles, such as silver and gold nanoparticles. Similarly, optical interconnects provide for transmission of light between devices. Integrated optical interconnects can be formed from materials with suitable indices of refraction. For transmitting visible light, silica, alumina and zinc oxide, for example, can be used. Barrier layers can be formed, for example, from silicon nitride particles under silicon dioxide or metal layers. Insulating layers can be formed, for example, from silicon dioxide nanoparticles. Field emission devices for displays can incorporate phosphor particles, such as zinc oxide.

Figure 10:
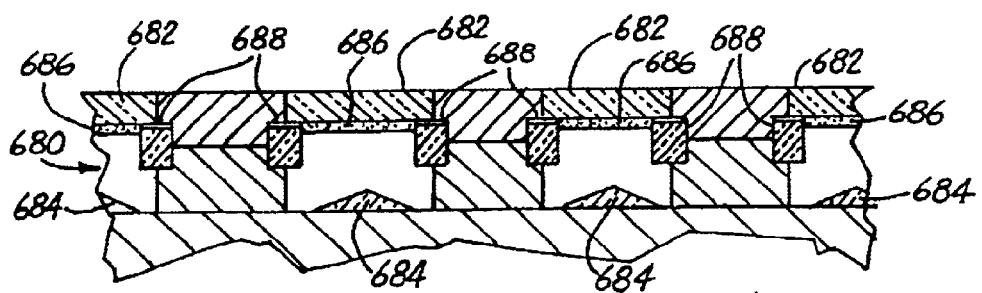
FIG. 10 is a fragmentary side view of a flat panel display with field emission devices.

The structure of one embodiment of a field emission device is shown in FIG. 10. Referring to FIG. 10, a flat panel display 680 based on field emission devices involves anodes 682 and cathodes 684 spaced a relatively small distance apart. Each electrode pair forms an individually addressable pixel. A phosphor layer 686 is located between each anode 682 and cathode 684. The phosphor layer 686 includes phosphorescent nanoparticles as described above. Phosphorescent particles with a selected emission frequency can be located at a particular addressable location. The particles can be fluorescent particles. The phosphor layer 686 is excited by low velocity electrons travelling from the cathode 684 to the anode 682. Grid electrodes 688 can be used to accelerate and focus the electron beam as well as act as an on/off switch for electrons directed at the phosphor layer 686. An electrically insulating layer is located between anodes 682 and grid electrodes 688. As shown in FIG. 10, the anode should be at least partially transparent to permit transmission of light emitted by phosphor 686.

One or more of the structures within the field emission devices in FIG. 10 can be formed by the self-assembly approaches described herein. The formation of field emission devices using nanoparticles generally is described further in copending and commonly assigned U.S. patent application Ser. No. 08/962,515 to Kambe et al., entitled "Phosphors," incorporated herein by reference. This patent application also described other structures for field emission devices.

Figure 11:
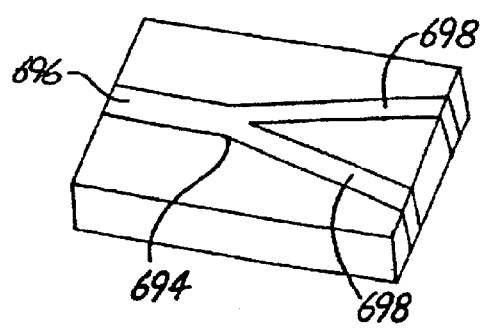
FIG. 11 is a top perspective view of a coupler/divider.

Referring to FIG. 11, a coupler/divider is shown. Coupler/divider 694 includes a coupled arm 696 and two branches 698. Coupler/divider 694 can be used to connect a plurality of devices by electrical transmission or for optical transmission. Suitable materials for electrical and optical transmission are described above.

Figure 12:
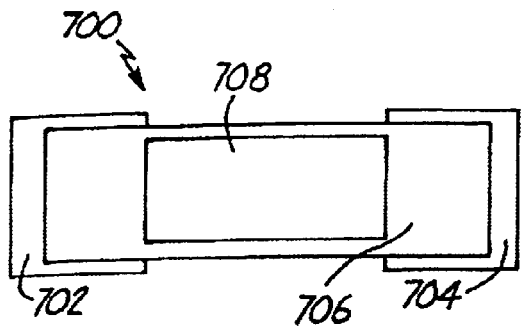
FIG. 12 is a top view of a field effect transistor.
Figure 13:
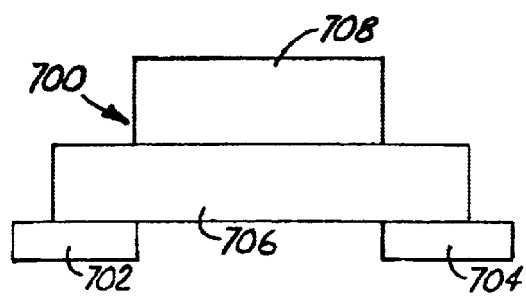
FIG. 13 is a side view of the field effect transistor of FIG. 12.

Referring to FIGS. 12 and 13, a field effect transistor (FET) is shown. FET 700 includes a source electrode 702, a drain electrode 704, a channel 706 and a gate electrode 708. One or more of the elements can be constructed using self-assembled materials using the approaches described herein. In particular, electrodes 702, 704, 708 can be formed using electrically conductive metals, as described above. Channel 706 can be formed from an electrically insulating material.

Self-assembled structures can be used for control electrodes within microelectromechanical devices. These devices generally have miniature mechanical components under electrical control. For example, a microelectromechanical device with a cantilever beam is described in U.S. Pat. No. 6,040,611 to De Los Santos et al., entitled "Electromechanical Device," incorporated herein by reference.

The identification of a suitable activation or deactivation technique may depend on the particular self-assembly approach used. The localization approaches generally involve either activation of the area for the placement of the self-assembled structure or by deactivating locations separate from the selected locations. In particular, the localization approach isolates the region for the formation of the self-assembled structure. Suitable physical forces or chemical materials are applied to perform the activation/deactivation.

Various approaches can be adapted for these purposes, including, for example, conventional integrated electronic circuit processing approaches. Specifically, mask techniques can be used to isolated the boundaries of the activation/deactivation process. Radiation or chemical application can be performed in regions defined by the mask. Similarly, focused beams can be used to perform the localization. Suitable focused beams to achieve surface modification include, for example, light beams, such as ultraviolet light or x-ray, laser beams, electron beams or ion beams, which can be focused to impinge on the selected region to perform activation or deactivation. Suitable focusing approaches are known in the art.

An activation process can involve the formation of a specific material at the desired location or the removal of a material or composition that is inhibiting self-assembly at the desired location. Specifically, a particular material can be formed within the boundaries that allows for the self-assembly process to occur within the boundaries, while the surface material outside of the boundaries does not allow for the self-assembly process. For example, an oxide layer can be formed within the boundaries that binds to a linker compound, while the substrate surface outside the boundary has a different chemical composition that does not bind to the linker molecule. Similarly, a layer of photoresist or other compound can be removed from the area within the boundaries to expose a surface material that binds to a linker or other compound required in the self-assembly process. The composition of the photoresist or other compound is selected to inhibit the self-assembly process such that the regions covered by the inhibitory compound surrounding the boundary region subsequently do not become involved in the self-assembly process.

Similarly, the regions outside of the boundary region can be deactivated. For example, a composition that binds a linker compound or other compound involved in the self-assembly process can be applied over an entire surface. Then, the composition can be removed from outside of the bounded region selected for the self-assembly process. Then, the self-assembly process only takes place within the bounded region. In addition, an inhibitor material can be specifically deposited outside of the boundary region so that the self-assembly process only takes place within the bounded region where the inhibitory material has been removed. Similarly, radiation can be used to inactivate or dissociate compounds outside of the bounded region. The mask and/or focused beam approaches described above can be used to perform the deactivation processes. As noted above, strata or layers can be processed to produce a three dimensional integrated structure.

These processes can be generalized. For example, while the discussion describes individual bounded regions, generally a plurality of bounded regions are formed in a simultaneous process according to a design for the completed product. Similarly, multiple self-assembly and other deposition processes can be combined in a variety of convenient ways. In some embodiments, all but a portion of the substrate surface is covered with an inhibitory compound. The uncovered portion can be divided into locations that are sequentially activated to allow for self-assembly within the bounded locations. Thus, several distinct structures are constructed within the uncovered portion of the substrate. After the self-assembly is completed within the selected portion or portions of the substrate, the remaining area of the substrate surface can be processed, as desired. Self-assembly processes can be combined with other approaches, including conventional deposition approaches, such as chemical vapor deposition, ion beam deposition, sputtering, and the like, to produce the desired product.

Preferred self-assembly approaches described herein involve the deposition of nanoparticles in self-assembled structure. The use of nanoparticles in the structures can lead to mechanically stronger devices relative to other self-assembled structures. However, the localization approaches can be used with other self-assembly approaches or combination of self-assembly approaches involving non-particulate compounds. For example, thin metal oxide films can be self-assembled on silicon or glass substrates using a linker compound. The substrate is first contacted with long chain hydrocarbons, including for example vinyl polymers, with a trichlorosilane group at one end and a second functional group, such as Br, CN, SCOCH$_3$, SCN, COOMe, OH, COOH, SO$_3$, COOCF$_3$, at the other end. The trichlorosilane (—SiCl$_3$) group binds to an oxide or hydroxide bearing surface of a silicon or glass substrate. The second functional group binds metal ions. Upon subsequent heating, a thin metal oxide layer is formed having an ordered, uniformly dense crystalline structure. This process is described further in U.S. Pat. No. 5,352,485 to DeGuire et al., entitled "Synthesis of Metal Oxide Thin Films," incorporated herein by reference. Localization approaches can inhibit or encourage binding of the substrate with the trichlorosilane group. Similarly, linkers with a functional group for binding to a substrate and an aldehyde functional group can be used to self-assemble proteins. Amino acid side chains in proteins bond to aldehyde groups.

Preferred self-assembly approaches involve the deposition of nanoscale particles, such as the preferred particles described above. Self-assembly processes with nanoparticles can make use of the liquid or gaseous dispersions described above. These dispersions can be useful for the delivery of well dispersed nanoparticles to the self-assembly location. To assist with the delivery process, a suitable nozzle can be used to deliver the dispersion to the general area for performing the self-assembly process. Nozzles used in the manufacturing of integrated electrical circuits for the delivery of other materials can be adapted for the delivery of nanoparticle dispersions.

In some embodiments involving self-assembly with nanoparticles, a portion of the substrate surface is provided with pores. The pores can be in an ordered array or a random arrangement. The size of the pores should be larger than the size of the nanoparticles. Generally, the pores have a diameter less than a micron, although the preferred size of the pores and density of the pores may depend on the particular desired properties of the resulting device.

To deposit the nanoparticles within the pores, the surface is contacted with a dispersion of the particles. Then, the dispersion is destabilized with respect to the particles, such that the particles tend to settle onto the surface and into the pores. The dispersion can be destabilized by altering the pH, such as adjusting the pH toward the isoelectric point, by diluting surfactants or by adding a cosolvent that results in a less stabile dispersion. The dispersion is removed after the deposition of a desirable amount of particles. Then, particles on the surface can be removed. For example, the surface can be rinsed gently with a dispersant to remove particles on the surface. Alternatively, the surface can be planarized by polishing, such as mechanical polishing or chemical-mechanical polishing. If the dispersant is properly selected to be not be too effective at dispersing the particles and if the rinsing is not done too extensively, the particles along the surface can be preferentially removed while leaving the particles within the pores behind.

Ordered arrays of pores can be formed using proteins that form two dimensional crystals. Suitable proteins include, for example, hemocyanin, cytochrome oxidase, porin from *E. coli* outer membrane, acetylcholine, and rhodopsin. Alternatively, crystalline zeolites can be formed along the surface that form periodic arrays of nanocrystalline pores. These crystals can be formed epitaxially. Similarly, the pores can be formed by ion milling. For example, argon ions or other suitable ions can be directed at the surface along a particular pattern to drill into the surface and form the pores. Other types of radiation, such as x-ray radiation, electron beam radiation, particle beam, plasma or combinations thereof, can be used to drill holes in a substrate surface. These various approaches to pore formation are described in U.S. Pat. No. 4,728,591 to Clark et al., incorporated herein by reference.

In addition, a porous structure can be formed using anodized aluminum oxide or other metal oxides. Anodized aluminum oxide forms highly oriented and very uniform pores. Pores are formed in anodic aluminum oxide by place an aluminum anode in a solution of dilute acid, such as sulfuric acid, phosphoric acid, or oxalic acid. As the aluminum is oxidized, aluminum oxide with pores is formed. Pore diameters at least can be varied between 4 nm and 200 nm. The pores have a depth on a micron scale. The formation of porous anodized aluminum oxide is described, for example, in D. Al-Mawlawi et al., "Nano-wires formed in anodic oxide nanotemplates," J. Materials Research, 9:1014–1018 (1994) and D. Al-Mawlawi et al., "Electrochemical fabrication of metal and semiconductor nano-wire arrays," in Proc. Symp. Nanostructured Mater. Electrochem., 187th Meeting Electrochem. Soc., Reno, Nev., May 21–26, 1995, Electrochem. Soc. 95(8):262–273 (1995).

In some preferred embodiments, self-assembly techniques involve the chemical bonding of the nanoparticles to the substrate using a linker compound. The linker molecule preferably includes at least two functional groups, although more than two functional groups can be included. One of the functional groups bonds to the substrate and the second functional group bonds to the nanoparticle. During the self-assembly process a plurality of linkers generally bond to a single nanoparticle.

For example, the binding of extremely small cadmium sulfide crystallites to a substrate surface using linker molecules is described in U.S. Pat. No. 5,751,018 to Alivisatos et al., incorporated herein by reference. Preferred linker molecules have from 4–6 carbon atoms, although longer unsaturated groups can be used without having excessive undesirable looping of the linker. Thiol groups can be used to bind to sulfide particles and certain metal substrates. Carboxyl groups can bind to other metal substrates and metal nanoparticles. As noted above, trichlorosilicate (–SiCl$_3$) functional groups can react with metal oxides as substrates or as particles by way of a condensation reaction. Similarly, amines and hydroxide groups would be expected to bind with metal oxides and metal nitrides.

The approach described in the Alivisatos et al. patent can be adapted for the self-assembly of the wide range of highly uniform nanoparticles described herein. For example, a linker with a carboxyl (–COOH) group can be used to bind to metal particles and a linker with a trichlorosilane (–SiCl$_3$) group can bind to metal oxide particles. Sulfide groups (–SH) can be used to bind to some metal particles, such as gold, and to sulfide particles.

Other self-assembly approaches are based on surface charge. Suitable localization techniques, such as ion beam or electron beam impingement, can be used to provide surface charge in a bounded region for self-assembly. If the nanoparticles or other compounds have suitable charged properties, they are attracted to the charged surface where they self-assemble to form desired structures.

Figure 14:
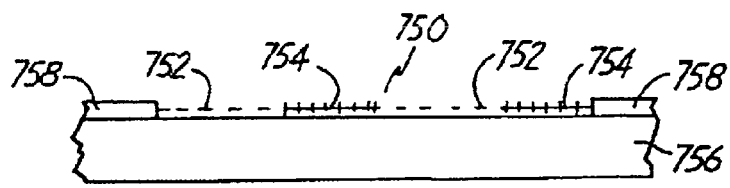
FIG. 14 is a side view of a self-assembled block copolymer.
Figure 15:
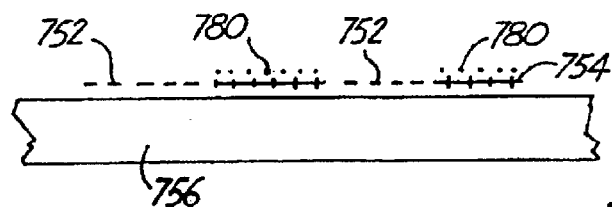
FIG. 15 is a side view of a self-assembled block copolymer with associated nanoparticles.

In addition, block copolymers can be used to form structures by self-assembly. Block copolymers include domains within polymer strands with one polymer composition attached to domains of a different polymer composition. If the different polymers compositions have different properties, such as polarity or degree of hydrophobicity, the domains tend to segregate into an ordered domain. Referring to FIG. 14, a four block copolymer 750 with two alternating polymer domains 752, 754 is placed onto a substrate 756 between two blocked regions 758. The blocking composition is selected to resist association with the polymers, although if the blocking composition is removable, any associated polymer can be removed with the blocking composition. On the substrate, the polymer domains segrigate so that strips are presented on the substrate with each strip containing polymer of one composition adjacent strips with polymer of a different composition. Once the self-assembled polymer array is formed, blocking material 758 can be removed. If the copolymer or corresponding monomers prior to polymerization are contacted with nanoparticles 760 that bind with one of the polymer compositions but not the other polymer composition, an ordered self-assembled structure is formed with a composite of polymer and nanoparticles, as shown in FIG. 15.

Suitable block copolymers include, for example, polystyrene-block-poly(methylmethacrylate) and polystyrene-block-polybutadiene. Block copolymers with other numbers of blocks and other types of polymer compositions can be used. The polymer segments can include functional side groups to assist with the self-assembly process. The relative chain lengths can be selected to form the desired structures on the surface. Structures on the order of hundreds of nanometers to a few nanometers can be formed straightforwardly with block copolymers.

In any of the self-assembly approaches, a plurality of sequential self-assembly approaches can be used. For example, a linker or other activation compound can be self-assembles within a bounded region. The linker or other activation compound subsequently drive the self-assembly of other desired particles or compounds at the location of the activation compound.

The embodiments described above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A material having a layer, the layer comprising a plurality of self-assembled structures comprising compositions, wherein the structures are localized in separate, selected locations covering a portion of the layer in an integrated assembly and wherein the compositions comprise inorganic particles.

2. The material of claim 1 wherein the inorganic particles have an average secondary particle diameter from about 2 nm to about 200 nm.

3. The material of claim 1 wherein the inorganic particles have an average secondary particle diameter less than about 100 nm and the primary particles having a distribution in sizes such that at least about 95 percent, of the primary particles have a diameter greater than about 40 percent of the average diameter and less than about 160 percent of the average diameter.

4. The material of claim 1 wherein the particles include effectively no primary particles with a diameter greater than about a factor of four times the average particle size.

5. The material of claim 1 wherein the particles have an average secondary particle diameter less than about 100 nm, the particles being located within pores of a material in the layer.

6. The material of claim 1 wherein the particles comprise a metal oxide.

7. The material of claim 1 wherein the compositions are attached to the surface with a linker molecule.

8. The material of claim 7 wherein the linker molecule comprises an organic compound with two functional groups.

9. The material of claim 1 wherein the particles are fluorescent particles or phosphorescent particles.

10. The material of claim 1 wherein the composition comprises a metal.

11. The material of claim 1 wherein the composition comprises a biological macromolecule.

12. The material of claim 1 wherein the composition comprises silica.

13. A material comprising a self-assembled formation of inorganic particles, the inorganic particles having an average primary particle diameter less than about 100 nm and the particles comprising a composition selected from the group consisting of metal/silicon oxides, metal/silicon carbides, metal/silicon nitrides and elemental metal.

14. The material of claim 13 wherein the primary particles have a distribution in sizes such that at least about 95 percent of the primary particles have a diameter greater than about 40 percent of the average diameter and less than about 160 percent of the average diameter.

15. The material of claim 1 wherein the inorganic particles have an average primary particle diameter from about 2 nm to about 100 nm.

16. The material of claim 1 wherein the inorganic particles have an average primary particle diameter from about 12 nm to about 50 nm.

17. The material of claim 1 wherein the particles are in an ordered array within at least one of the self-assembled islands.

18. The material of claim 1 wherein the plurality of islands are located along different layers within the material.

19. The material of claim 13 wherein effectively no primary particles have a diameter greater than about a factor of four times the average primary particle size.

20. The material of claim 13 wherein the inorganic particles have an average primary particle diameter from about 2 nm to about 50 nm.

21. The material of claim 13 wherein the inorganic particles have an average secondary particle diameter from about 20 nm to about 400 nm.

22. The material of claim 13 wherein the inorganic particles are in an ordered array with the self-assembled formation.

23. The material of claim 13 wherein the self-assembled formation is integrated into an integrated assembly.

24. The material of claim 13 wherein the inorganic particles comprise a metal oxide.

25. The material of claim 13 wherein the inorganic particles comprise a phosphor composition.

26. The material of claim 13 wherein the inorganic particles comprise a material with an index of refraction suitable for transmitting visible light.

27. The material of claim 13 wherein the self-assembled structure has a photonic band gap that prevents propagation of light in any direction.

* * * * *